United States Patent
Kotsuji

(10) Patent No.: US 9,841,069 B2
(45) Date of Patent: Dec. 12, 2017

(54) VEHICLE CONTROL DEVICE AND VEHICLE CONTROL METHOD

(71) Applicants: JATCO Ltd, Fuji-shi, Shizuoka (JP); NISSAN MOTOR CO., LTD., Yokohama-shi, Kanagawa (JP)

(72) Inventor: Kouichi Kotsuji, Numazu (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 153 days.

(21) Appl. No.: 14/778,518

(22) PCT Filed: Feb. 12, 2014

(86) PCT No.: PCT/JP2014/053134
§ 371 (c)(1),
(2) Date: Sep. 18, 2015

(87) PCT Pub. No.: WO2014/148147
PCT Pub. Date: Sep. 25, 2014

(65) Prior Publication Data
US 2016/0290418 A1    Oct. 6, 2016

(30) Foreign Application Priority Data

Mar. 21, 2013  (JP) .................................. 2013-058502

(51) Int. Cl.
*F16H 59/72*  (2006.01)
*F16D 48/06*  (2006.01)
(Continued)

(52) U.S. Cl.
CPC .............. *F16D 48/06* (2013.01); *B60K 6/387* (2013.01); *B60K 6/543* (2013.01); *B60W 20/40* (2013.01);
(Continued)

(58) Field of Classification Search
None
See application file for complete search history.

(56) References Cited

U.S. PATENT DOCUMENTS

2004/0192499 A1* 9/2004 Sakamoto ............. B60W 10/06
477/98
2005/0217957 A1* 10/2005 Imamura ............... F16H 61/143
192/3.3
(Continued)

FOREIGN PATENT DOCUMENTS

EP        2 891 812 A1   7/2015
JP        H05-087233 A   4/1993

*Primary Examiner* — Justin Holmes
(74) *Attorney, Agent, or Firm* — Foley & Lardner LLP

(57) ABSTRACT

A vehicle control device for controlling a vehicle with a frictional engagement element provided between a drive source and drive wheels includes a first determination unit configured to determine whether or not a signal of an inhibitor switch indicates a traveling position, a second determination unit configured to determine whether or not an oil path communicating with the frictional engagement element is in a drain state, a temperature estimation unit configured to estimate temperature of the frictional engagement element, and a temperature estimation prohibition unit configured to prohibit temperature estimation of the frictional engagement element by the temperature estimation unit when the signal of the inhibitor switch indicates the traveling position and the oil path is in the drain state.

5 Claims, 2 Drawing Sheets

(51) Int. Cl.
*B60K 6/387* (2007.10)
*B60K 6/543* (2007.10)
*B60W 20/40* (2016.01)
*F16H 59/10* (2006.01)
*F16H 59/68* (2006.01)

(52) U.S. Cl.
CPC ......... *F16H 59/72* (2013.01); *B60W 2400/00* (2013.01); *B60W 2510/0291* (2013.01); *B60W 2710/021* (2013.01); *B60Y 2200/92* (2013.01); *B60Y 2300/42* (2013.01); *B60Y 2400/424* (2013.01); *B60Y 2400/428* (2013.01); *B60Y 2400/72* (2013.01); *F16D 2500/1045* (2013.01); *F16D 2500/1088* (2013.01); *F16D 2500/10412* (2013.01); *F16D 2500/3053* (2013.01); *F16D 2500/30404* (2013.01); *F16D 2500/30405* (2013.01); *F16D 2500/7105* (2013.01); *F16H 59/105* (2013.01); *F16H 2059/6823* (2013.01); *F16H 2059/725* (2013.01); *Y10S 903/914* (2013.01); *Y10S 903/918* (2013.01); *Y10S 903/946* (2013.01)

(56) References Cited

U.S. PATENT DOCUMENTS

2011/0046861 A1* 2/2011 Moriyama ............ F16D 48/066
  701/67
2013/0261865 A1* 10/2013 Toki ........................ B60K 6/48
  701/22

* cited by examiner

VEHICLE CONTROL DEVICE AND VEHICLE CONTROL METHOD

TECHNICAL FIELD

The present invention relates to a vehicle control device and a vehicle control method.

BACKGROUND ART

Conventionally, it is disclosed in JP5-87233A to perform a fail processing when a range switching valve is located at an intermediate position between ranges.

SUMMARY OF INVENTION

When the range switching valve is located at the intermediate position between the ranges, an inhibitor switch signal may indicate a traveling position and an oil path communicating with a frictional engagement element may be in a drain state, for example. In this case, since a hydraulic pressure is not supplied to the frictional engagement element, the frictional engagement element is not engaged, but the frictional engagement element is determined to be engaged in control since the inhibitor switch signal indicates the traveling position.

When the frictional engagement element is engaged, heat is generated in the frictional engagement element since the frictional engagement element is engaged while slipping. If the frictional engagement element is overheated by the generated heat, the durability of the frictional engagement element is reduced. Thus, the overheating of the frictional engagement element is suppressed by estimating the temperature of the frictional engagement element and controlling, for example, the amount of lubricating oil supplied to the frictional engagement element on the basis of the estimated temperature.

If the temperature of the frictional engagement element is estimated in the above state, the frictional engagement element is determined to be engaged although the frictional engagement element is actually not engaged. Thus, the temperature of the frictional engagement element is estimated to be higher than an actual temperature. That is, an incorrect temperature of the frictional engagement element is estimated.

The present invention was developed to solve such a problem and aims to prevent the estimation of an incorrect temperature of a frictional engagement element.

A vehicle control device according to an aspect of the present invention is a vehicle control device for controlling a vehicle with a frictional engagement element provided between a drive source and drive wheels, comprising: first determination means configured to determine whether or not a signal of an inhibitor switch indicates a traveling position; second determination means configured to determine whether or not an oil path communicating with the frictional engagement element is in a drain state; temperature estimation means configured to estimate temperature of the frictional engagement element; and temperature estimation prohibition means configured to prohibit temperature estimation of the frictional engagement element by the temperature estimation means when the signal of the inhibitor switch indicates the traveling position and the oil path is in the drain state.

A vehicle control method according to another aspect of the present invention is vehicle control method for controlling a vehicle with a frictional engagement element provided between a drive source and drive wheels, comprising: determining whether or not a signal of an inhibitor switch indicates a traveling position; determining whether or not an oil path communicating with the frictional engagement element is in a drain state; estimating temperature of the frictional engagement element; and prohibiting temperature estimation of the frictional engagement element when the signal of the inhibitor switch indicates the traveling position and the oil path is in the drain state.

According to these aspects can prevent an incorrect temperature of the frictional engagement element from being estimated.

DESCRIPTION OF EMBODIMENT

Hereinafter, an embodiment of the present invention is described with reference to the accompanying drawings.

Figure 1:
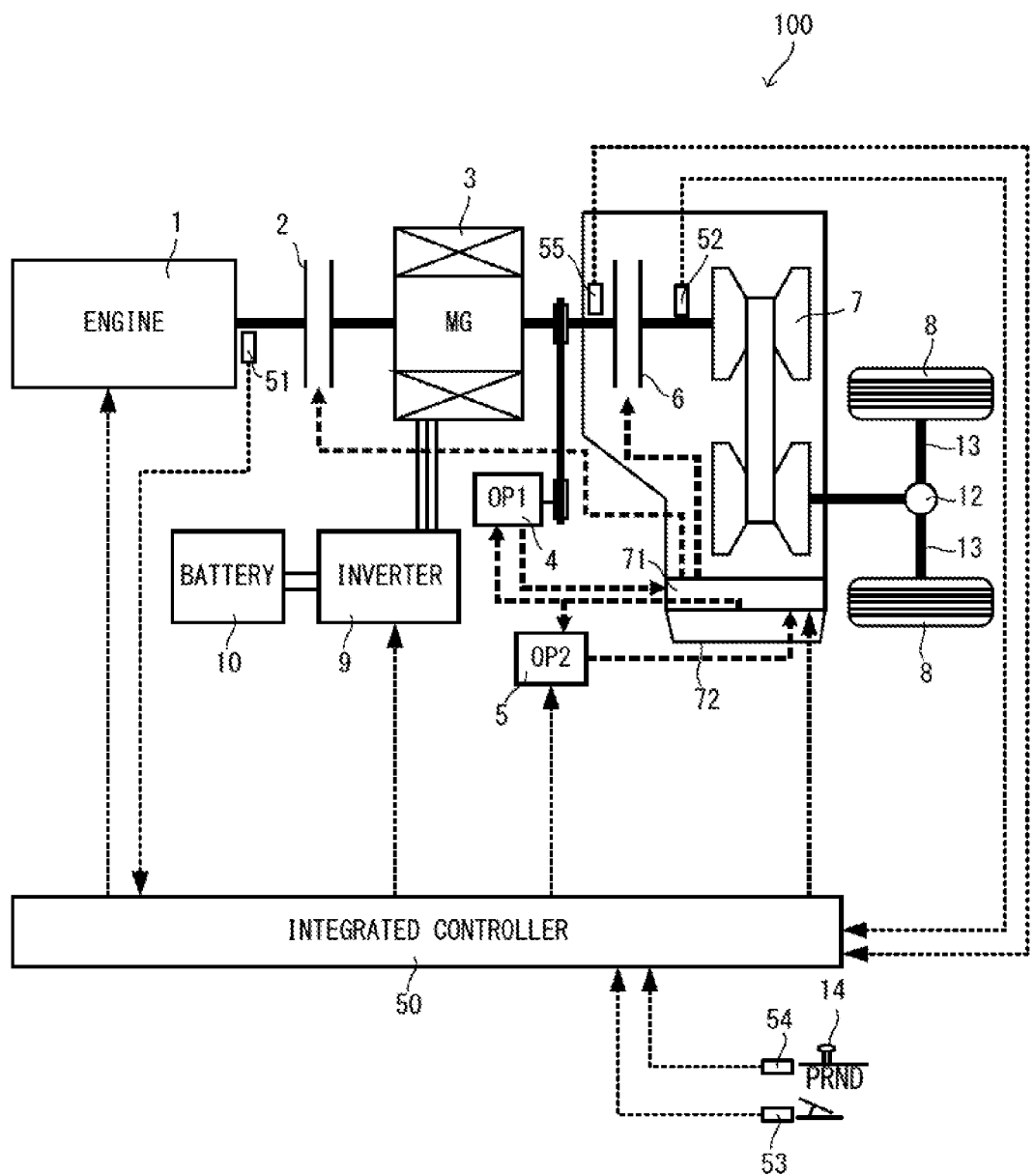
FIG. 1 is an overall configuration diagram of a hybrid vehicle.

FIG. 1 is an overall configuration diagram of a hybrid vehicle (hereinafter, referred to as a vehicle) 100. This vehicle 100 includes an engine 1, a first clutch 2, a motor generator (hereinafter, referred to as an MG) 3, a first oil pump 4, a second oil pump 5, a second clutch 6, a continuously variable transmission (hereinafter, referred to as a CVT) 7, drive wheels 8 and an integrated controller 50.

The engine 1 is an internal combustion engine using gasoline, diesel or the like as fuel and a rotation speed, a torque and the like are controlled on the basis of an engine control command from the integrated controller 50.

The first clutch 2 is a normally open, hydraulically driven clutch interposed between the engine 1 and the MG 3. The first clutch 2 is controlled to be engaged and released by a control hydraulic pressure produced by a hydraulic control valve unit 71 on the basis of a mode switch command from the integrated controller 50. For example, a dry multi-disc clutch is used as the first clutch 2.

The MG 3 is a synchronous rotating electric motor in which a permanent magnet is embedded in a rotor and a stator coil is wound around a stator. The MG 3 is controlled by applying a three-phase alternating current produced by an inverter 9 on the basis of an MG control command from the integrated controller 50. The MG 3 can operate as an electric motor which is driven to rotate upon receiving the supply of power from a battery 10. Further, the MG 3 functions as a generator for generating an electromotive force at opposite ends of the stator coil and can charge the battery 10 when the rotor receives rotational energy from the engine 1 or the drive wheels 8.

The first oil pump 4 is a vane pump driven by the engine 1 or the MG 3. The first oil pump 4 pumps up hydraulic oil stored in an oil pan 72 of the CVT 7 and supplies the oil to the hydraulic control valve unit 71.

The second oil pump 5 is an electric oil pump which operates upon receiving the supply of power from the battery 10. The second oil pump 5 is driven on the basis of a command from the integrated controller 50 when an oil amount is insufficient if only the oil pump 4 is driven, and pumps up the hydraulic oil stored in the oil pan 72 of the CVT 7 and supplies the oil to the hydraulic control valve unit 71 similarly to the first oil pump 4.

The second clutch 6 is interposed between the MG 3 and the CVT 7. The second clutch 6 is, for example, a hydraulically operated clutch provided in a forward/reverse switching mechanism composed of a planetary gear mechanism and controlled to be engaged/released by the control hydraulic pressure generated by the hydraulic control valve unit 71 on the basis of a forward/reverse switching command from the integrated controller 50. For example, a normally open, wet multi-disc clutch is used as the second clutch 6.

The hydraulic pressure supplied to the second clutch 6 is controlled by a manual valve, a solenoid valve and the like provided in the hydraulic control valve unit 71. The manual valve is mechanically coupled to a shift lever 14 and switches an oil path in conjunction with the operation of the shift lever 14. The solenoid valve is driven by a torque instruction signal calculated on the basis of a signal from an inhibitor switch 54 for detecting the position of the shift lever 14 and controls the hydraulic pressure supplied to the second clutch 6 to a hydraulic pressure corresponding to an instructed transmission torque. The second clutch 6 is engaged when the shift lever 14 is in a travel range and the signal from the inhibitor switch 54 indicates a traveling position. Travel ranges include a R-range in which the vehicle 100 travels backward in addition to ranges, such as a D-range, in which the vehicle 100 travels forward. Traveling positions similarly include a position in which the vehicle 100 travels backward in addition to positions in which the vehicle travels forward.

A detection range of the inhibitor switch 54 for detecting the position of the shift lever 14 is set to be wide and a signal from the inhibitor switch 54 is switched before the operation of the shift lever 14 is completed. Thus, when the shift lever 14 is held between a non-travel range and the travel-range, e.g. when the shift lever 14 is held between an N-range and the D-range on the way to the D-range from the N-range, the signal of the inhibitor switch 54 indicates a D-position, but the manual valve is in a position corresponding to the N-range. Thus, an oil path communicating with the second clutch 6 is in a drain state, no hydraulic pressure is supplied to the second clutch 6 and the second clutch 6 is in a released state. Such a state occurs, for example, when a driver holds the shift lever 14 between the N-range and the D-range or when the shift lever 14 is held between the N-range and the D-range against the driver's intention.

Further, oil (hereinafter, referred to as lubricating oil) is supplied to the second clutch 6 to prevent the second clutch 6 from being overheated.

The CVT 7 is arranged downstream of the MG 3 and can continuously change a speed ratio according to a vehicle speed, an accelerator pedal opening and the like. The CVT 7 includes a primary pulley, a secondary pulley and a belt mounted on the both pulleys. The CVT 7 continuously changes the speed ratio by moving a movable pulley of the primary pulley and a movable pulley of the secondary pulley in an axial direction by a primary pulley pressure and a secondary pulley pressure generated using discharge pressures from the first and second oil pumps 4, 5 as source pressures and changing pulley contact radii of the belt.

A differential 12 is connected to an output shaft of the CVT 7 via an unillustrated final reduction gear mechanism and the drive wheels 8 are connected to the differential 12 via a drive shaft 13.

To the integrated controller 50 are input signals and the like from an engine rotation speed sensor 51 for detecting a rotation speed of the engine 1, a rotation speed sensor 55 for detecting an input rotation speed of the second clutch 6, a rotation speed sensor 52 for detecting an output rotation speed of the second clutch 6 (input rotation speed of the CVT 7), an accelerator pedal opening sensor 53 for detecting an accelerator pedal opening and the inhibitor switch 54 for detecting the position of the shift lever 14 of the CVT 7. The integrated controller 50 executes various controls for the above engine 1, MG 3 and CVT 7 on the basis of these.

The vehicle 100 does not include a torque converter unlike conventional vehicles mounted with an automatic transmission. Thus, the vehicle 100 starts while the second clutch 6 is slip-engaged.

Accordingly, there are more operation regions where the second clutch 6 is slipped as compared with the case where a torque converter is included. Thus, the vehicle 100 supplies the lubricating oil of an amount appropriate for the amount of heat generation of the second clutch 6 to suppress the overheating of the second clutch 6.

If the second clutch 6 is, nevertheless, overheated, a protection control for protecting the second clutch 6 is executed. In the protection control, a temperature increase of the second clutch 6 is suppressed, for example, by reducing an engine torque and reducing a torque transmitted to the second clutch 6. Further, the driver is notified of an increase in the temperature of the second clutch 6 by blinking a warning light or the like. If the temperature of the second clutch 6 further increases, an increase in the temperature of the second clutch 6 is prevented by stopping the engine 1 and the MG 3 and stopping the vehicle 100 in the protection control. The protection control is executed when the estimated temperature of the second clutch 6 becomes higher than a predetermined temperature.

In the present embodiment, the amount of heat generated in the second clutch 6 is calculated by integrating the instructed transmission torque of the second clutch 6 and a rotation speed difference between an input shaft of the second clutch 6 and an output shaft of the second clutch 6 and the temperature of the second clutch 6 is estimated on the basis of the calculated amount of heat.

Although the temperature of the second clutch 6 can also be estimated using an estimated transmission torque of the second clutch 6, the estimated transmission torque is calculated by subtracting a friction of the first oil pump 4 and the like from the sum of an engine torque generated in the engine 1 and a motor torque generated in the MG 3 and affected by a variation of each element. Thus, the accuracy of temperature estimation is degraded. Accordingly, in the present embodiment, the temperature of the second clutch 6 is estimated using the instructed transmission torque of the second clutch 6.

Further, in the present embodiment, a rotation speed control is executed so that the engine does not rev up. The rotation speed control is a control for generating power by the MG 3 and preventing the engine from revving up such as when the engine will rev up. Thus, even if an accelerator pedal is depressed to increase the engine torque when no hydraulic pressure is supplied to the second clutch 6 and the second clutch 6 is in the released state, the engine torque is used for power generation by the MG 3, wherefore the engine does not rev up and the estimated transmission torque is small.

In the vehicle 100, the shift lever 14 may be held between the N-range and the D-range, the signal of the inhibitor switch 54 may indicate the D-position and the manual valve may be in the position corresponding to the N-range as described above. In this case, the hydraulic pressure to the second clutch 6 is in the drain state, no hydraulic pressure is supplied to the second clutch 6 and the second clutch 6 is in the released state. Even if the accelerator pedal is depressed in such a state, the estimated transmission torque of the second clutch 6 does not increase due to the rotation speed control, but the instructed transmission torque of the second clutch 6 increases according to the accelerator pedal opening, thereby causing a deviation between the estimated transmission torque and the instructed transmission torque. Since the estimated transmission torque is small, the actual temperature of the second clutch 6 does not increase very much. However, the estimated temperature of the second clutch 6 is higher than the actual temperature since being estimated on the basis of the instructed transmission torque. That is, an incorrect temperature of the second clutch 6 is estimated. When the estimated temperature of the second clutch 6 becomes higher than the predetermined temperature, the protection control is executed. Specifically, the protection control is executed although the temperature of the second clutch 6 is not actually higher than the predetermined temperature and the protection control needs not be executed.

Accordingly, in the present embodiment, it is prevented to estimate an incorrect temperature of the second clutch 6 and execute an unnecessary protection control.

Figure 2:
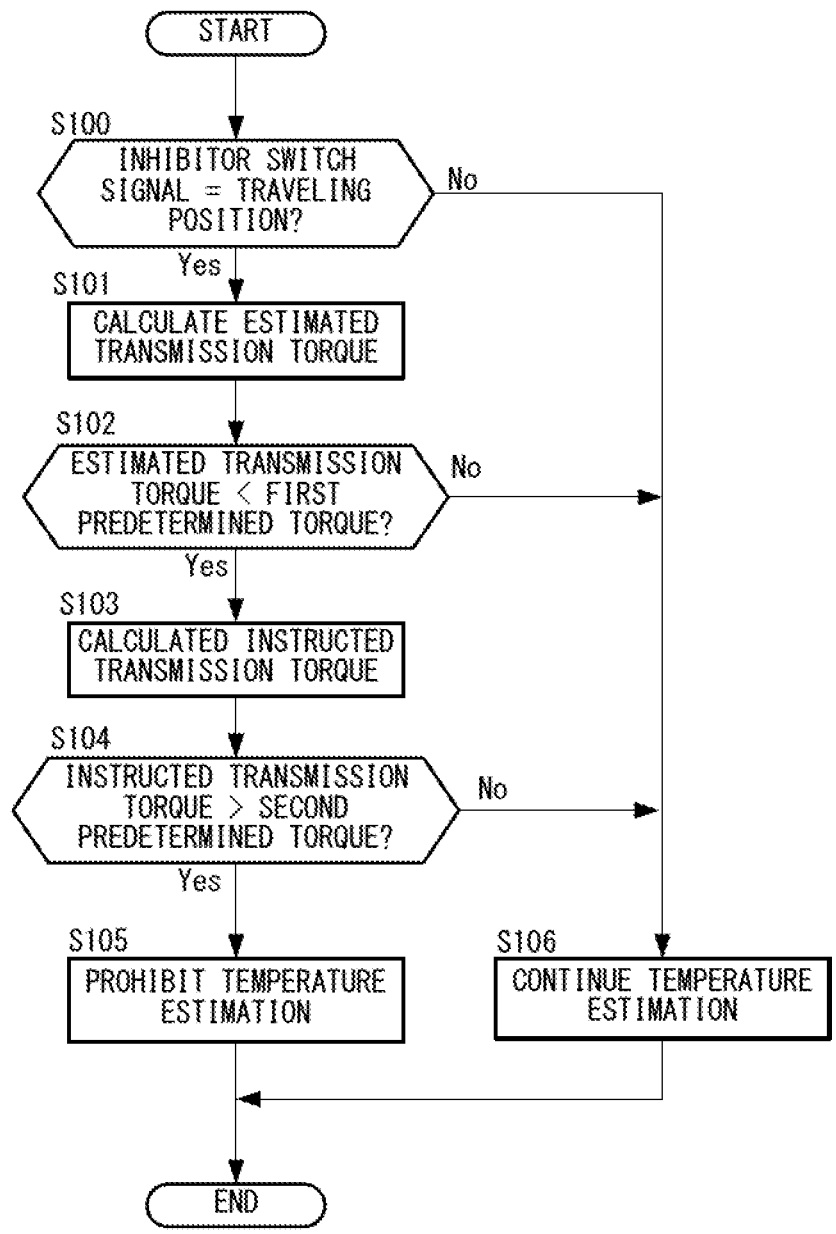
FIG. 2 is a flow chart showing a temperature estimation prohibition control of an embodiment.

Next, a temperature estimation prohibition control of the present embodiment is described using a flow chart of FIG. 2.

In Step S100, the integrated controller 50 determines whether or not the signal of the inhibitor switch 54 indicates a traveling position. A process proceeds to Step S101 if the signal of the inhibitor switch 54 indicates the traveling position while proceeding to Step S106 unless the signal of the inhibitor switch 54 indicates the traveling position.

In Step S101, the integrated controller 50 calculates the estimated transmission torque of the second clutch 6. The integrated controller 50 calculates the estimated transmission torque by subtracting the friction of the first oil pump 4 and the like from the sum of the engine torque generated in the engine 1 and the motor torque generated in the MG 3.

In Step S102, the integrated controller 50 determines whether or not the estimated transmission torque of the second clutch 6 is not larger than a first predetermined torque. The first predetermined torque is a torque capable of determining whether or not the hydraulic pressure is supplied to the second clutch 6. In the present embodiment, when the rotation speed control is executed and no hydraulic pressure is supplied to the second clutch 6, the estimated transmission torque of the second clutch 6 is small regardless of whether or not the accelerator pedal is depressed. Thus, if the estimated transmission torque is not larger than the first predetermined torque, the integrated controller 50 determines that the oil path for supplying the hydraulic pressure to the second clutch 6 is in the drain state and no hydraulic pressure is supplied to the second clutch 6 and the process proceeds to Step S103. On the other hand, if the estimated transmission torque is larger than the first predetermined torque, the integrated controller 50 determines that the hydraulic pressure is supplied to the second clutch 6 and the process proceeds to Step S106. When the rotation speed control is executed by the MG 3, it is also conceivable to determine that the oil path for supplying the hydraulic pressure to the second clutch 6 is in the drain state and no hydraulic pressure is supplied to the second clutch 6. However, the integrated controller 50 is not detecting whether or not the MG 3 is executing the rotation speed control. Thus, whether or not the estimated transmission torque of the second clutch 6 is not larger than the first predetermined torque is determined as described above.

If the signal of the inhibitor switch 54 is determined to indicate the traveling position in Step S100 and the estimated transmission torque of the second clutch 6 is determined to be not larger than the first predetermined torque in Step S102, it is determined that the oil path communicating with the second clutch 6 is in the drain state and no hydraulic pressure is supplied to the second clutch 6 although the shift lever 14 is held between the non-travel range and the travel range and the signal of the inhibitor switch 54 indicates the traveling position.

In Step S103, the integrated controller 50 calculates the instructed transmission torque. The integrated controller 50 calculates a target engagement capacity of the second clutch 6 on the basis of the accelerator pedal opening and the like and calculates the instructed transmission torque on the basis of the target engagement capacity.

In Step S104, the integrated controller 50 compares the instructed transmission torque and a second predetermined torque. The second predetermined torque is a torque capable of determining a possibility that the temperature of the second clutch 6 becomes higher than the predetermined temperature and the protection control is executed, and set in advance. The process proceeds to Step S105 if the instructed transmission torque is larger than the second predetermined torque while proceeding to Step S106 if the instructed transmission torque is not larger than the second predetermined torque.

In Step S105, the integrated controller 50 prohibits the estimation of the temperature of the second clutch 6. If the temperature of the second clutch 6 is estimated on the basis of the instructed transmission torque when no hydraulic pressure is supplied to the second clutch 6 although the inhibitor switch 54 indicates the traveling position, a temperature higher than the actual temperature is estimated. Thus, the integrated controller 50 prohibits the temperature estimation of the second clutch 6. In the present embodiment, the temperature estimation of the second clutch 6 is further prohibited when there is a possibility of executing the protection control.

In Step S106, the integrated controller 50 continues to estimate the temperature of the second clutch 6.

Effects of the embodiment of the present invention are described.

The temperature estimation of the second clutch 6 is prohibited when the signal of the inhibitor switch 54 indicates the traveling position and the oil path communicating with the second clutch 6 is in the drain state to supply no hydraulic pressure to the second clutch 6. This can prevent an incorrect temperature of the second clutch 6 from being estimated when the second clutch 6 is not engaged and the temperature of the second clutch 6 is not actually increased.

The protection control is executed when the estimated temperature of the second clutch 6 becomes higher than the predetermined temperature, but the temperature estimation of the second clutch 6 is prohibited when the signal of the inhibitor switch 54 indicates the traveling position and the oil path communicating with the second clutch 6 is in the drain state to supply no hydraulic pressure to the second clutch 6. Thus, the protection control can be prevented from being executed although the temperature of the second clutch 6 is actually not higher than the predetermined temperature and the protection control needs not be executed. This can prevent the protection control from being unnecessarily executed to limit the traveling performance of the vehicle 100 and give a sense of incongruity to the driver.

Further, the temperature estimation of the second clutch 6 is prohibited only when the instructed transmission torque is larger than the second predetermined torque and there is a possibility of executing the protection control. This can prevent the temperature estimation of the second clutch 6 from being prohibited and enables the temperature of the second clutch 6 to be estimated, for example, when the shift lever 14 is in the D-range, the instructed transmission torque is small and the estimated transmission torque is small due to the control of the engine 1 and the like according to the instructed transmission torque.

If the temperature estimation is prohibited when the estimated transmission torque is smaller than the first predetermined torque regardless of the value of the instructed transmission torque, the temperature estimation is prohibited even if the instructed transmission torque is not larger than the second predetermined torque. Thus, the temperature estimation is prohibited when the estimated transmission torque is smaller than the first predetermined torque due to a variation of the estimated transmission torque with respect to the instructed transmission torque. Further, in an operating state where the instructed transmission torque is very low, the estimated transmission torque may be smaller than the first predetermined torque regardless of the variation of the estimated transmission torque. Also in this case, the temperature estimation is prohibited. That is, the temperature estimation is prohibited although the signal of the inhibitor switch 54 indicates the traveling position and the oil path communicating with the second clutch 6 is not in the drain state. In this case, in a device capable of executing a protection control different from the above protection control using an instructed transmission torque, the other protection control may not be executed if the temperature estimation is prohibited. For example, if the second clutch 6 is repeatedly engaged and released in a short time, the amount of heat generated in the second clutch 6 may increase even if the estimated transmission torque is not larger than the first predetermined torque and the instructed transmission torque is not larger than the second predetermined torque. In such a case, when the temperature of the second clutch 6 is estimated on the basis of the instructed transmission torque and the temperature of the second clutch 6 increases, it is conceivable to execute another protection control such as to reduce the torque of the engine 1 in order to prevent a reduction in the durability of the second clutch 6. In the present embodiment, when the instructed transmission torque having a possibility that the estimated transmission torque becomes smaller than the first predetermined torque although the signal of the inhibitor switch 54 indicates the traveling position and the oil path communicating with the second clutch 6 is not in the drain state is not larger than the second predetermined torque, the temperature estimation is continued. Thus, such another protection control can be executed.

Since the second clutch 6 slips to generate heat when the vehicle 100 starts, it is essential to accurately estimate the temperature of the second clutch 6 and protect the second clutch 6 by controlling a flow rate of the lubricating oil and the like. In the present embodiment, such incorrect estimation of the temperature of the second clutch 6 can be prevented.

Although the embodiment of the present invention has been described above, the above embodiment is merely one application example of the present invention and not of the nature to limit the technical scope of the present invention to the specific configuration of the above embodiment.

Although the instructed transmission torque and the second predetermined torque have been compared and a possibility of executing the protection control has been determined in the above embodiment, the estimated temperature of the second clutch 6 may be compared with the predetermined temperature or a temperature set lower than the predetermined temperature in view of a safety margin. This can also provide effects similar to those of the present embodiment.

Although the temperature of the second clutch 6 is estimated using the instructed transmission torque of the second clutch 6 in the above embodiment, the temperature of the second clutch 6 may be estimated using an instructed hydraulic pressure to the second clutch 6. Further, although whether or not the hydraulic pressure is supplied to the second clutch 6 is determined using the estimated transmission torque, whether or not the hydraulic pressure is supplied to the second clutch 6 may be determined using an actual hydraulic pressure detected by a hydraulic pressure sensor. This can also provide effects similar to those of the present embodiment.

Although the rotation speed control is executed in the above embodiment, whether or not the hydraulic pressure is supplied to the second clutch 6 may be determined on the basis of the engine rotation speed when the rotation speed control is not executed, e.g. in the case of a vehicle not including the MG 3. This can also provide effects similar to those of the present embodiment.

Although the temperature estimation of the second clutch 6 is prohibited when the instructed transmission torque is larger than the second predetermined torque in Step S104 in the above embodiment, this prohibition may be omitted. This can suppress power consumed by the second oil pump 5 by suppressing the operation of the second oil pump 5 when no hydraulic pressure is supplied to the second clutch 6.

The present application claims for priority based on Japanese Patent Application No. 2013-58502 filed with Japan Patent Office on Mar. 12, 2013, and the entire contents of this application are incorporated in this Description by reference.

The invention claimed is:

1. A vehicle control device for controlling a vehicle with a frictional engagement element provided between a drive source and drive wheels, the frictional engagement element being engaged when a signal from an inhibitor switch indicates a traveling position and being in a released state when an oil path communicating with the frictional engagement element is in a drain state, comprising:
   a first determination unit configured to determine whether the signal of the inhibitor switch indicates the traveling position;
   a second determination unit configured to determine whether the oil path communicating with the frictional engagement element is in the drain state;
   a temperature estimation unit configured to estimate temperature of the frictional engagement element; and
   a temperature estimation prohibition unit configured to prohibit temperature estimation of the frictional engagement element by the temperature estimation unit when the signal of the inhibitor switch indicates the traveling position and the oil path is in the drain state.

2. The vehicle control device according to claim 1, comprising:
   a protection control unit configured to execute a protection control for protecting the frictional engagement element when the estimated temperature of the frictional engagement element estimated by the temperature estimation unit is higher than a predetermined temperature, wherein the temperature estimation prohibition unit is configured to prohibit the temperature estimation of the frictional engagement element by the temperature estimation unit when the signal of the inhibitor switch indicates the traveling position, the oil path is in the drain state and the estimated temperature of the frictional engagement element is higher than the predetermined temperature.

3. The vehicle control device according to claim 1, wherein:
the frictional engagement element is a starting frictional engagement element to be slipped when the vehicle starts.

4. A vehicle control method for controlling a vehicle with a frictional engagement element provided between a drive source and drive wheels, the frictional engagement element being engaged when a signal from an inhibitor switch indicates a traveling position and being in a released state when an oil path communicating with the frictional engagement element is in a drain state, comprising:
determining whether the signal of the inhibitor switch indicates the traveling position;
determining whether the oil path communicating with the frictional engagement element is in the drain state;
estimating temperature of the frictional engagement element; and
prohibiting temperature estimation of the frictional engagement element when the signal of the inhibitor switch indicates the traveling position and the oil path is in the drain state.

5. A vehicle control device for controlling a vehicle with a frictional engagement element provided between a drive source and drive wheels, the frictional engagement element being engaged when a signal from an inhibitor switch indicates a traveling position and being in a released state when an oil path communicating with the frictional engagement element is in a drain state, comprising:
first determination means for determining whether the signal of the inhibitor switch indicates the traveling position;
second determination means for determining whether the oil path communicating with the frictional engagement element is in the drain state;
temperature estimation means for estimating temperature of the frictional engagement element; and
temperature estimation prohibition means for prohibiting temperature estimation of the frictional engagement element by the temperature estimation means when the signal of the inhibitor switch indicates the traveling position and the oil path is in the drain state.

* * * * *